3,780,053
PHOSPHORUS DERIVATIVES OF TRIAZOLIN-5-ONES AND THIONES
John L. Miesel, Indianapolis, Ind., assignor to Eli Lilly and Company, Indianapolis, Ind.
No Drawing. Filed July 19, 1972, Ser. No. 273,247
Int. Cl. C07f 9/16, 9/40
U.S. Cl. 260—308 C
6 Claims

ABSTRACT OF THE DISCLOSURE

A defined class of novel 5 - oxo(thioxo) - 1,3 - (alkyl, alkenyl or cycloalkyl) - $\Delta^2$ - 1,2,4-triazolin - 4 yl methyl phosphorus derivatives are useful as insecticides, acaricides, and anthelmintics.

BACKGROUND OF THE INVENTION

Science has known for years that many types of chemical insecticides are very valuable and beneficial to man. The field of insecticides was one of the first fields in which organic chemical research was used against an economic biological problem. Insecticides derived from programs of organic chemical research are useful in killing insects and acarids which are directly harmful to man, in increasing crop yields, and in increasing yields of animal products.

Despite the years of effort which have been expended on research in organic chemical insecticides, many problems remain to be solved by new and better insecticides. One of the major problems is the resistance which insects and acarids develop after a given insecticide has been used for a period of time. When such a resistance develops, it can be avoided only by a change to a new insecticide, to which the pests have not yet become resistant. Further, even the best insecticides now known are not so perfect that they could not be replaced by newer insecticides of higher activity, higher selectivity, or less hazard to man, to crop plants, or to animals.

Therefore, those engaged in insecticide research continue to search for new and better insecticidal compounds. One of the fertile fields in which new types of desirable insecticides continue to be found is the organic phosphate field. For example, useful additions to the phosphate insecticide art were made by the following researchers.

Cebalo, West German Auslegeschrift 2,029,375, and Timmler, U.S. Pat. 3,594,390, taught the utility and preparation of 5-thiono-$\Delta^2$-1,2,4-triazoline phosphorus derivatives.

British Pat. 713,278 disclosed insecticidal activity of phosphorus derivatives of a very wide range of heterocyclic ring compounds containing keto or thioketo groups.

Pianka, J. Sci. Food Agr. 19, 475–480 (1968), showed insecticidal utility of phosphorus derivatives of oxadiazole- and thiadiazole-thiones. Pianka also prepared a phosphorus derivative of a 1,3,4-triazolin-5-thione.

West German Auslegeschrift 2,006,020 discloses insecticidal and acaricidal 6-oxopyridazinomethyl phosphorothiolothionates. The compounds were made by the reaction of an alkaline earth metal or ammonium salt of the desired phosphorus derivative with a 1-halomethyl-6-oxopyridazine.

Jamison, U.S. Pat. 3,632,598, disclosed phosphorus derivatives of oxazolidine-2,4-dione which were said to have systemic acaricidal activity against the two-spotted mite.

Japanese Pat. 41,543/71 recently disclosed a process for the synthesis of phosphorus derivatives of 4-thiazolidone. The compounds produced thereby were said to be insecticidal agents.

U.S. Pat. 3,634,435 recently disclosed thio and dithiophosphorus derivatives of pyridone where the phosphorus moiety is linked through a methylene group to the ring.

The invention to be disclosed in this specification and claims deals, as do the above references, with phosphorus derivatives of a hetero ring compound. However, it will be clear to those skilled in the organic chemical art, and especially to those skilled in the organic chemical insecticide art, that the present invention is distinct from all earlier work.

The compounds which are described in this specification and claims will be named according to the current Chemical Abstracts nomenclature system. The nomenclature for phosphorus compounds is quite complex, being based on the specific names for the various phosphorus-containing acids. It is therefore all but impossible to use acceptable general names for the various oxygen- and sulfur-substituted phosphorus-containing moieties which my compounds contain. When the compounds are referred to generally, the term phosphorus-containing moieties or phosphorus derivatives will be used.

SUMMARY

I have now discovered and disclose a novel class of 5-oxo(thioxo)-1,3-(alkyl, alkenyl or cycloalkyl)-$\Delta^2$-1,2,4-triazolin-4-yl methyl phosphorus derivatives which are effective insecticides, acaricides, and anthelmintics. I have also invented insecticidal and acaricidal compositions which comprise my new triazoline compounds, and insecticidal and acaricidal methods which made use of those compounds.

DESCRIPTION OF THE PREFERRED EMBODIMENTS

My new pesticidal triazoline phosphorus derivatives are of the formula

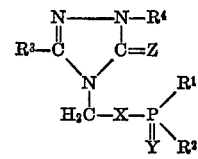

wherein X, Y, and Z independently represent oxygen or sulfur;

$R^1$ represents
  (A) $C_1$–$C_4$ alkyl,
  (B) $C_1$–$C_4$ alkylamino, or
  (C) $C_1$–$C_4$ alkoxy;

$R^2$ represents
  (A) $C_1$–$C_4$ alkyl,
  (B) $C_1$–$C_4$ alkylamino,
  (C) $C_1$–$C_4$ alkoxy, or
  (D) phenyl;

$R^3$ and $R^4$ independently represent
  (A) $C_1$–$C_6$ alkyl,
  (B) $C_3$–$C_8$ cycloalkyl, or
  (C) $C_3$–$C_4$ alkenyl.

In the above description, the general chemical terms bear their usual meanings in the organic chemical art. In order to improve the precision of the definition of my invention, examples of the general chemical terms will be given.

The terms $C_1$–$C_4$ alkyl, $C_1$–$C_4$ alkoxy, $C_3$–$C_4$ alkenyl, $C_1$–$C_6$ alkyl, and $C_3$–$C_8$ cycloalkyl refer to chemical groups such as ethyl, s-butyl, propyl, methoxy, propoxy, t-butoxy, 3-hexyl, 2-butyl, cyclopropyl, cyclopentyl, cyclooctyl, butyl, crotyl, and allyl.

The term $C_1$–$C_4$ alklamino refers to groups such as methylamino, propylamino, and butylamino.

The following compounds, which do not exhaust the compounds of my invention, are named in order to make the scope of my invention more clear to those skilled in the chemical art.

[(1-ethyl-3-methyl-5-oxo-$\Delta^2$-1,2,4-triazolin-4-yl)methyl] methylphenylphosphinate
[1,3-diisopropyl-5-oxo-$\Delta^2$-1,2,4-triazolin-4-yl)methyl] diethylphosphinodithioate
O-[(1-s-butyl-3-t-butyl-5-oxo-$\Delta^2$,1,2,4-triazolin-4-yl) methyl] P-butyl-N-methylphosphonamidothionate
O-ethyl S-[(3-hexyl-5-oxo-1-pentyl-$\Delta^2$-1,2,4-triazolin-4-yl)methyl] s-butylphosphonothioate
S-[(1-t-butyl-3-cyclobutyl-5-oxo-$\Delta^2$-1,2,4-triazolin-4-yl) methyl] O-propyl phenylphosphonothiolothionate
butyl [(3-cycloheptyl-5-oxo-1-propyl-$\Delta^2$-1,2,4-triazolin-4-yl)methyl] methyl phosphorothionate
S-[(3-cyclopropyl-1-methyl-5-oxo-$\Delta^2$-1,2,4-triazolin-4-yl) methyl] O-propyl t-butylphosphoramidothiolate
[(1-cyclobutyl-5-oxo-3-propyl-$\Delta^2$-1,2,4-triazolin-4-yl) methyl] dimethylphosphinate
O,O-dibutyl S-[(3-cyclohexyl-1-methyl-5-oxo-$\Delta^2$-1,2,4-triazolin-4-yl)methyl] phosphorothiolothionate
O-[(3-ethyl-1-methyl-5-oxo-$\Delta^2$-1,2,4-triazolin-4-yl) methyl] N,N'-diethylphosphorodiamidothionate
[(1,3-dimethyl-5-thioxo-$\Delta^2$-1,2,4-triazolin-4-yl) methyl] N-ethyl-P-methylphosphonamidate
S-[(3-cyclohexyl-1-ethyl-5-thioxo-$\Delta^2$-1,2,4-triazolin-4-yl)methyl] O-ethyl ethylphosphonothiolothionate
O-[(3-ethyl-1-pentyl-5-thioxo-$\Delta^2$-1,2,4-triazolin-4-yl) methyl] phenylpropylphosphinothionate
S-[(1-hexyl-3-isopropyl-5-thioxo-$\Delta^2$-1,2,4-triazolin-4-yl) methyl] O-methyl methylphosphoramidothiolate
[(1-cyclopropyl-3-hexyl-5-thioxo-$\Delta^2$-1,2,4-triazolin-4-yl) methyl] isopropyl methylphosphonate
[[1-cyclobutyl-3-(1-methylbutyl)-5-thioxo-$\Delta^2$-1,2,4-triazolin-4-yl]methyl] P-butyl-N-propylphosphonamidodithioate
O-(1-t-butyl-3-cyclopropyl-5-thioxo-$\Delta^2$-1,2,4-triazolin-4-yl)methyl] N-butyl-P-methylphosphonamidothionate
S-[(3-butyl-1-cyclopropyl-5-thioxo-$\Delta^2$-1,2,4-triazolin-4-yl)methyl] O-ethyl O-propyl phosphorothiolate
[(3-cyclobutyl-1-cycloheptyl-5-thioxo-$\Delta^2$-1,2,4-triazolin-4-yl)methyl] butylethylphosphinate
[(3-cyclooctyl-1-isopropyl-5-thioxo-$\Delta^2$-1,2,4-triazolin-4-yl)methyl] s-butylmethylphosphinodithioate
O,O-diethyl O-[(3-methyl-1-propyl-5-thioxo-$\Delta^2$-1,2,4-triazolin-4-yl)methyl] phosphorothionate
S-[(1-methyl-3-propyl-5-thioxo-$\Delta^2$-1,2,4-triazolin-4-yl) methyl] N-s-butyl-N'-methylphosphorodiamidothiolate
[(3-s-butyl-1-methyl-5-thioxo-$\Delta$-1,2,4-triazolin-4-yl) methyl] N-ethyl-P-phenylphosphonamidate
S-[(1-s-butyl-3-cycloheptyl-5-thioxo-$\Delta^2$-1,2,4-triazolin-4-yl)methyl] O-ethyl butylphosphonothiolothionate
S-[(3-allyl-1-butyl-5-oxo-$\Delta^2$-1,2,4-triazolin-4-yl)methyl] O,O-dimethyl phosphorothiolothionate
S-[(3-crotyl-1-cyclopropyl-5-thioxo-$\Delta^2$-1,2,4-triazolin-4-yl)methyl] O,O-diethyl phosphorothiolothionate
S-[(1-allyl-3-ethyl-5-oxo-$\Delta^2$-1,2,4-triazolin-4-yl)methyl] O,O-dipropyl phosphorothiolothionate
O,O-dibutyl S-[(1-crotyl-3-methyl-5-thioxo-$\Delta^2$-1,2,4-triazolin-4-yl)methyl] phosphorothiolothionate The following compounds are the preferred species of my invention.

O,O-diethyl S-[(3-ethyl-1-methyl-5-oxo-$\Delta^2$-1,2,4-triazolin-4-yl)methyl] phosphorothiolothionate
O,O-diethyl S-[(3-ethyl-1-methyl-5-thioxo-$\Delta^2$-1,2,4-triazolin-4-yl)methyl] phosphorothiolothionate
O,O-diethyl S-(1,3-dimethyl-5-oxo-$\Delta^2$-1,2,4-triazolin-4-yl)methyl] phosphorothiolothionate
O,O-diethyl S-[(1,3-dimethyl-5-thioxo-$\Delta^2$-1,2,4-triazolin-4-yl)methyl] phosphorothiolothionate
diethyl [(1-allyl-3-methyl-5-thioxo-$\Delta^2$-1,2,4-triazolin-4-yl)methyl] phosphorothionate I have also discovered a method of killing insects or acarids which comprises contacting the insect or acarid or the locus of the insect or acarid with an effective amount of one of the compounds just described. Further, I have discovered insecticidal or acaricidal compositions which comprise an inert carrier and one of the compounds of the formula shown above.

The most effective methods of contacting insects and acarids, or the locus of insects and acarids, and the most effective formulations of insecticidal and acaricidal compositions will be discussed below in this specification.

My novel compounds are made by the following general methods of synthesis, which are methods known to the organic chemical art. The process in each case consists of forming the triazoline ring, adding an appropriately substituted 4-methyl group, and then adding the appropriate phosphorus containing moiety.

The starting materials for all the syntheses by which my compounds are made are compounds known to the organic chemical art. All starting materials are either readily obtainable or may be synthesized by methods well known to the art.

The triazolin-5-one(thione) ring is very conveniently made by the process of Cebalo, U.S. Pat. 3,625,951. That process comprises ring closure of an appropriately 1,2-disubstituted semicarbazide or thiosemicarbazide in basic aqueous solution.

The linking methylene group at the 4-position is added to the triazolin-5-one(thione) ring by reaction with formaldehyde to produce a 4-hydroxymethyltriazoline compound.

Where the phosphorus atom is linked to the methylene group through an oxygen atom, the compound is prepared by reaction of a 4-hydroxymethyltriazoline compound with an appropriately-substituted halo-substituted phosphorus derivative in benzene in the presence of a base.

If a compound wherein the phosphorus atom is linked to the methylene group through a sulfur atom is to be synthesized, the 4-hydroxymethyltriazoline compound is first converted to the 4-chloromethyl compound by reaction with thionyl chloride. The chloromethyl compound is then reacted with an alkali metal or ammonium salt of an appropriately substituted phosphorus derivative. The reaction is conveniently done in acetone but may be performed in any mildly polar organic solvent.

The following preparative examples are offered in order to enable those skilled in the art to obtain my compounds readily.

The first example illustrates the synthesis of the triazolin-5-one ring.

Example 1.—3-cyclopropyl-1-propyl-$\Delta^2$-1,2,4-triazolin-5-one

An 8 g. portion of 1-cyclopropylcarbonyl-2-propyl-semicarbazide is added to a solution of 3 g. of KOH in 150 ml. of water at 90° C. The mixture is stirred at 90–100° C. for 30 minutes. Then the mixture is cooled, acidified, and concentrated under vacuum to remove the water. The remaining residue is dissolved in ethyl acetate-ethanol and filtered. The filtrate is concentrated to a solid under vacuum, and that solid is recrystallized from ethyl acetate. The yield is 3.2 g. of a product identified as 3-cyclopropyl-1-propyl-$\Delta^2$-1,2,4-triazolin-5-one.

The above method is used, with slight alterations which readily can be supplied by one skilled in the organic chemical art, to make other triazolin-5-one ring compounds. For example, the following compounds are made as above.

3-methyl-1-pentyl-$\Delta^2$-1,2,4-triazolin-5-one
3-cyclohexyl-1-propyl-$\Delta^2$-1,2,4-triazolin-5-one
1-cyclopropyl-3-methyl-$\Delta^2$-1,2,4-triazolin-5-one
1,3-dimethyl-$\Delta^2$-1,2,4-triazolin-5-one
1,3-diethyl-$\Delta^2$,1,2,4-triazolin-5-one
1-butyl-3-ethyl-$\Delta^2$-1,2,4-triazolin-5-one
1-allyl-3-crotyl-$\Delta^2$-1,2,4-triazolin-5-one
1-crotyl-3-isopropyl-$\Delta^2$-1,2,4-triazolin-5-one Triazolin-5-thione rings are made, as shown below, in an analogous manner.

Example 2.—3-butyl-1-ethyl-Δ²-1,2,4-triazolin-5-thione

Two g. of NaOH is dissolved in 100 ml. of water at 90° C. To the solution is added 4.3 g. of 2-ethyl-1-valerylthiosemicarbazide, and the mixture is stirred at about 90° C. for 30 minutes. Then the mixture is cooled, acidified, and the water is evaporated under vacuum. The residue is purified and recrystallized from ethyl acetate as shown above in Example 1. The recrystallized product is identified by NMR as 2.8 g. of 3-butyl-1-ethyl-Δ²-1,2,4-triazolin-5-thione.

The method of Example 2 is used to make other triazolin-5-thione compounds such as the following.

1,3-dimethyl-Δ²-1,2,4-triazolin-5-thione
3-methyl-1-propyl-Δ²-1,2,4-triazolin-5-thione
1-cyclopentyl-3-methyl-1,2,4-triazolin-5-thione
1-hexyl-3-methyl-Δ²-1,2,4-triazolin-5-thione
1-cyclohexyl-3-propyl-Δ²-1,2,4-triazolin-5-thione
1,3-dibutyl-Δ²-1,2,4-triazolin-5-thione
3-allyl-1-cyclohexyl-Δ²-1,2,4-triazolin-5-thione
3-crotyl-1-propyl-Δ²-1,2,4-triazolin-5-thione The phosphorus-containing moiety of my compounds is linked to the triazoline ring through a methylene group, which is added as shown below.

Example 3.—4-hydroxymethyl-1,3-dimethyl-Δ²-1,2,4-triazolin-5-thione

A mixture of 1.7 g of 1,3-dimethyl-Δ²-1,2,4-triazolin-5-thione, 10 ml. of 37 percent formaldehyde, and a few milligrams of potassium carbonate is heated for 6 hours at 55–60° C. The mixture is evaporated to dryness under vacuum, 25 ml. of benzene-ethanol is added, and that mixture is evaporated to dryness. The residue is impure 4-hydroxymethyl-1,3-dimethyl-Δ²-1,2,4-triazolin-5-thione, which is used as an intermediate in further synthesis without purification.

Example 4.—4-chloromethyl-1,3-dimethyl-Δ²-1,2,4-triazolin-5-thione

The product from Example 3 is dissolved in 50 ml. of $CHCl_3$ and 10 ml. of $SOCl_2$ is added. The mixture is refluxed for 3 hours. The reaction mixture is then evaporated to dryness under vacuum, 20 ml. of toluene is added, and the mixture is evaporated again to produce 2.7 g. of crude 4-chloromethyl-1,3-dimethyl-Δ²-1,2,4-triazolin-5-thione which is used as an intermediate without purification.

Compounds wherein the phosphorous moiety is linked the ring through an oxygen atom (that is, where X in the generic formula is oxygen) are made by the following method.

Example 5.—Diethyl[(1,3-dimethyl-5-thioxo-Δ²-1,2,4-triazolin-1-yl)methyl] phosphorothionate A mixture of 6.8 g. of 4-hydroxymethyl-1,3-dimethyl-Δ²-1,2,4-triazolin-5-one, 11.3 g. of diethyl phosphorochloridothionate, 6.0 g. of triethylamine, and 200 ml. of benzene is heated under reflux for 3 hours. The mixture is cooled, 300 ml. of ether is added, and the solution is filtered. The filtrate is evaporated to dryness under vacuum.

The crude product is chromatographed on 250 ml. of silica gel using benzene-ethyl acetate mixtures. The fraction collected in 50 percent ethyl acetate-50 percent benzene is evaporated to dryness, taken up in ether, and washed twice with 2 percent $Na_2CO_3$ solution. The ether layer is dried, filtered, and evaporated to yield about 220 mg. of product, which is identified as diethyl[(1,3-dimethyl-5-thioxo-Δ²-1,2,4-triazolin-1-yl)methyl] phosphorothionate.

Compounds wherein the phosphorous moiety is linked to the ring through a sulfur atom (X in the generic formula is sulfur) are made by the following process.

Example 6.—O,O-diethyl S-[(1,3-dimethyl-5-thioxo-Δ²-1,2,4-triazolin-4-yl)methyl] phosphorothiolothionate A mixture of 2.7 g. of 4-chloromethyl-1,3-dimethyl-Δ²-1,2,4-triazolin-5-thione, 50 ml. of acetone, and 3.5 g. of O,O-diethyl phosphorothiolothionate, ammonia salt is refluxed with stirring for 4 hours. The mixture is then cooled, filtered, and evaporated to dryness. The residue is taken up in ether and washed with 2 percent $Na_2CO_3$ solution. The ether layer is dried over magnesium sulfate and then is evaporated under vacuum.

The residual oil is chromatographed on a column of 250 ml. of silica gel with benzene-ethyl acetate. The product-containing fractions are combined and evaporated under vacuum to produce 100 mg. of a light yellow oil, which is identified as O,O-diethyl S-[(1,3-dimethyl-5-thioxo-Δ²-1,2,4-triazolin-4-yl)methyl] phosphorothiolothionate.

All of the triazoline phosphorus derivatives of my invention are synthesized by the methods which are exemplified in Examples 5 and 6.

My new triazoline phosphorus derivatives are useful for killing insects and acarids. The insecticidal and acaricidal data below shows that my compounds are effective in killing a large variety of species of harmful insects and acarids. The fraction of the contacted pests which will be killed depends on the hardiness of the species of insect and the amount of the compound which contacts them.

It is necessary that at least an effective amount of the pesticidal compound contact the pest to be killed. Effective amounts of pesticides are usually measured by the concentration of the active compound in the insecticidal or acaricidal composition. For example, for a given pest to be controlled, the effective amount might be 5 percent of active compound in a dust composition, or 100 p.p.m. of active compound in a water-dispersed composition. The determination of the effective amount for each pest is accomplished by merely applying different compositions to the pest or to the locus of the pest and observing the result. Effective amounts will be found to fall within the ranges of from about 1 to about 1,000 p.p.m. of active compound in water-dispersed compositions, and between about 0.5 percent and about 10 percent of active compound in dust compositions.

These compounds are active, for example, against such acarids as red spider mite, citrus mite, two-spotted spider mite, Pacific mite, clover mite, fowl mite, various species of ticks, and various species of spiders. The compounds are also active against insects of the various orders including Mexican bean beetle, boll weevil, corn rootworms, cereal leaf beetle, flea beetles, borers, Colorado potato beetle, grain beetles, alfalfa weevil, carpet beetle, confused flour beetle, powder post beetle, wireworms, rice weevil, rose beetle, plum curculio, Japanese beetle, white grubs, melon aphid, rose aphid, white fly, grain aphid, corn leaf aphid, pea aphid, mealybugs, scales, leafhoppers, thrips, citrus aphid, spotted alfalfa aphid, green peach aphid, bean aphid, milkweed bug, tarnished plant bug, box elder bug, bed bug, squash bug, chinch bug, ants, house fly, yellow fever mosquito, stable fly, horn fly, fleas, lice, cattle grubs, cabbage maggot, carrot rust fly, seed corn maggot, Southern armyworm, codling moth, cutworms, clothes moth, Indian meal moth, leafrollers, corn earworm, European corn borer, imported cabbage worm, cabbage looper, cotton bollworm, bagworm, sod webworm, tent caterpillar, fall armyworm, German cockroach, and American cockroach.

I have proved the effectiveness of my compounds by scientific tests. For example, O,O-diethyl S-[(1,3-dimethyl-5-thioxo-Δ²-1,2,4-triazolin-4-yl)methyl] phosphorothiolothionate kills the following percentages of insect and acarid populations when the compound is applied to plants infested with the pests in the form of a water emulsion at the indicated concentrations.

Mexican bean beetle: Percent
 250 p.p.m. ---------------------------------- 80
 25 p.p.m. ----------------------------------- 80
 10 p.p.m. ----------------------------------- 30
Melon aphid:
 250 p.p.m. ---------------------------------- 90
 25 p.p.m. ----------------------------------- 90
 10 p.p.m. ----------------------------------- 30
2-spotted spider mite:
 250 p.p.m. ---------------------------------- 90
 25 p.p.m. ----------------------------------- 90
 10 p.p.m. ----------------------------------- 20

The same compound, sprayed in direct contact with houseflies, killed 90 percent of the flies at 50 p.p.m. and 70 percent at 25 p.p.m. When applied to food to be ingested by houseflies, the compound killed 90 percent when a 250 p.p.m. composition was used, and 80 percent when a 50 p.p.m. composition was used.

The insecticidal and acaricidal compositions used in the above tests were prepared by dissolving the compound in a water-miscible solvent with emulsifiers, and dispersing the solution in the correct amount of water to make the desired concentration.

The pesticides of my invention are useful for killing pests on plants. They are also useful for the control of pests in many other environments where those pests are harmful. For example, the compounds can be combined with inks, adhesives, soaps, polymers, cutting oils, and paints for the control of pests in those substances or on surfaces to which those substances may be applied. My compounds can be applied to textiles and to cellulose sheet materials, and can be employed in the impregnation of wood, lumber, and fibers. My compounds can also be effectively used to protect stored grain or seeds from pests.

A special insecticidal use for which my compounds are well suited is killing mosquito larvae. As is well known, mosquito larvae spend their entire pre-adult existence in water. In order to control the larvae, it is necessary to get the larvicidal compound in contact with the larvae through the water. My triazoline phosphorus derivatives can be brought into contact with the larvae through the water by placing in the water any of the insecticidal compositions discussed below.

In order to control acarids and insects with my compounds, the compounds must be brought into contact with the pest. It is possible to contact the pest directly with the compound, or to deposit the compound on a locus which the pest infests. For example, a compound may be deposited on the pest's food, in water inhabited by the pest, on inert surfaces, on plants inhabited by the pest, or simply dispersed as an aerosol.

My compounds are brought into contact with the pest to be killed, or with the locus of the pest, in the form of insecticidal or acaricidal compositions which are formulated according to standard methods in the agricultural chemicals art. In order to make the best methods of use of my compounds clear, some explanation of the formulation of my insecticidal and acaricidal compositions will be given.

Insecticidal and acaricidal compositions comprise one of my active triazoline phosphorus derivatives and at least one inert carrier. Inert carriers may be chosen from liquids, solids, and in the case of aerosol compositions, even from the gases.

Most often, my compounds are prepared in the form of concentrated formulations which are applied to the pest's habitat in the form of water dispersions or emulsions containing from about 1 to about 1,000 p.p.m. of the active compound. Water-dispersible or emulsifiable concentrations are either solids usually known as wettable powders, or liquids usually known as emulsifiable concentrates.

Pesticidal wettable powders comprise an intimate mixture of the active compound, an inert carrier, and surfactants. The concentration of the active compound is usually, for the sake of economy, reasonably high, such as from 10 percent to 90 percent. The inert carrier, comprising from about 5 to about 90 percent of the composition, is usually chosen from among the attapulgite clays, the montmorillonite clays, the diatomaceous earth, or in exceptional cases, from the purified silicates. Effective surfactants, which are usually used at the rate of from about 0.5 percent to about 10 percent, are usually chosen from among the sulfonated lignins, the condensed naphthalenesulfonates, the naphthalenesulfonates, the alkylbenzenesulfonates, the alkyl sulfates, and the nonionic surfactants such as the ethylene oxide adducts of phenol.

Pesticidal emulsifiable concentrates of my phosphorus derivatives usually comprise a convenient concentration of the active compound, such as from about one-half to about 4 pounds per gallon of liquid, dissolved in an inert carrier which is a mixture of water-immiscible organic solvent and emulsifiers. The organic solvent must of course be chosen with due regard to phytotoxicity, if the mixture is to be applied to plants, or to mammalian toxicity, and to cost. Useful organic solvents include the aromatics, especially the xylenes, and the petroleum fractions, especially mineral spirits and the high-boiling naphthalenic and olefinic portions of petroleum including heavy aromatic naphtha. Other organic solvents may also be used, such as the terpenic solvents including derivatives of pine rosin and such solvents of high solvent potency as tetrahydrofuran and dimethyl sulfoxide. Suitable emulsifiers for emulsifiable concentrates are chosen from the same types of surfactants used for wettable powders.

It may be desirable to add substances to a water dispersion or emulsion of one of my active compounds in order to assist the active compound in adhering to the substance to which it is applied. For example, water-dispersible gums, polybutene compounds, cationic surfactants, and water-dispersible polymers are effectively used, especially for application to plants. Such substances can be useful in maintaining the triazoline compounds in contact with the locus of the pests.

My compounds are also frequently applied to the habitat of pests in the form of dusts. The formulation of a pesticidal dust of one of my compounds usually requires no more sophisticated art than the intimate mixing of the finely ground pesticide with a finely ground, inexpensive, solid inert carrier. Widely-used insecticidal dust carriers include the kaloin clays, chalk, sulfur, pyrophyllite clays, montmorillonite clays, volcanic earths, and vegetable dusts such as ground walnut shell. Pesticidal dusts of my triazoline phosphorus derivatives usually contain from 0.5 to about 5 percent of active compound, depending on the severity and the identity of the pest which is of primary concern. A stabilizer such as a glycol or an acid scavenger, such as epichlorohydrin, is necessary when dusts are to be made with active, highly sorptive clays.

When it is desired to suspend one of my compounds as an aerosol in order to contact airborne pests, the primary problem is to sufficiently atomize a solution of the compound. The most usual way to form pesticidal aerosols is to package the active compound in a pressurized package commonly known as an "aerosol bomb." Such products comprise a pressure-tight container filled with a solution of the active compound in an inert carrier which is a solvent mixed with propellants which are gases at normal ambient temperatures. The container is closed with an atomizing valve. The solvents and propellants must be chosen with due regard to their toxicity, since they are atomized along with the active compound.

Solvents for use in aerosol formulations are usually chosen from among the low molecular weight alcohols, the halogenated solvents especially methylene chloride, low molecular weight ketones such as acetone, and low molecular weight paraffins such as hexane. Propellants are chosen from among the hydrocarbon gases, especially propane and the butanes, the halocarbon gases such as carbon tetrafluoride, dichlorodifluoromethane, and 1,2-dichloro - 1,1,2,2 - tetrafluoroethane, and in exceptional cases from among inert gases such as compressed nitrogen or carbon dioxide. Aerosol formulations of my compounds usually contain very small concentrations of the active compound, such as from about 0.005 percent to about 1 percent.

When my compounds are to be used for the control of pests which inhabit water or the earth, it may be convenient to formulate the compound as a granule. Such granules typically comprise the pesticidal compound dispersed on a granular inert carrier which is usually coarsely ground clay. The particle size of agricultural pesticidal granules usually ranges frm about 0.1 to about 3 mm. The usual formulation process comprises dissolving the phosphorus compound in an inexpensive solvent, such as kerosene or heavy aromatic naphtha, and applying the solution to the carrier in an appropriate solids mixer. Less economically, my pesticidal compound may be dispersed in a dough composed of damp clay or other inert carrier. The dough is then dried and coarsely ground to produce the desired granular product.

A particularly preferred method of forming granules of my novel compounds is known as marumerization and is accomplished in specific equipment which was disclosed in U.S. Pat. 3,579,719. The marumerization process comprises the dispersion of the active compound in a damp dough of an appropriate inert carrier, particularly clay such as attapulgite clay, kaolin clay, or diatomaceous earth, the extrusion of the pesticidal dough through a die containing small holes in the range of from about 0.2 mm. to about 3 mm., and the rolling of the extrudate on a horizontal rotating plate. The plate rotates at the bottom of a vertical cylinder and is usually scored or roughened in order to increase the friction between the rotating plate and the extrudate. The rolling action of the particles of extrudate breaks the long particles into sections approximately as long as the extrudate is thick, rolls the broken particles against one another, and forms the particles into rounded ellipsoidal or approximately spherical granules which have superior uniformity of particle size, freedom from dust, and flow characteristics.

Mixtures of pesticides, such as two or more insecticides or an insecticide and a fungicide, are often used to allow treatment of a habitat for control of several pests by one application. The use of my triazoline phosphorus derivatives in such mixtures is feasible and is within the scope of my invention.

Many compounds within the scope of my invention have useful biological activities other than insecticidal and acaricidal activities. Some of my compounds are, for example, fungicides, anthelmintics, herbicides, viricides, and bactericides. My fungicidal triazoline phosphorus derivatives are useful for the control of fungi such as, for example, *Ceratocystis ulmi*, the organism which causes Dutch elm disease.

Other significant biological activities possessed by selected compounds of my invention include the control of bacteria such as bacterial rust of beam, of viruses such as maize dwarf virus, and weeds such as crabgrass and pigweed. Members of my novel group of compounds also possess the ability to control or kill internal parasites such as *Haemonchus contortus*.

I claim:
1. A compound of the formula

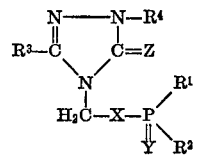

wherein

X, Y, and Z independently represent oxygen or sulfur;
$R^1$ represents
  (A) $C_1$–$C_4$ alkyl,
  (B) $C_1$–$C_4$ alkylamino, or
  (C) $C_1$–$C_4$ alkoxy;
$R^2$ represents
  (A) $C_1$–$C_4$ alkyl,
  (B) $C_1$–$C_4$ alkylamino,
  (C) $C_1$–$C_4$ alkoxy, or
  (D) phenyl;
$R^3$ and $R^4$ independently represent
  (A) $C_1$–$C_6$ alkyl,
  (B) $C_3$–$C_8$ cycloalkyl, or
  (C) $C_3$–$C_4$ alkenyl.

2. The compound of claim 1 which is O,O-diethyl S-[3-ethyl - 1 - methyl - 5 - oxo - $\Delta^2$ - 1,2,4 - triazolin-4-yl)methyl]phosphorothiolothionate.

3. The compound of claim 1 which is O,O-diethyl S-[(3-ethyl - 1 - methyl - 5 - thioxo-$\Delta^2$-1,2,4-triazolin-4-yl)methyl]phosphorothiolothionate.

4. The compound of claim 1 which is O,O-diethyl S-[(1,3 - dimethyl - 5 - oxo - $\Delta^2$ - 1,2,4 - triazolin-4-yl)methyl]phosphorothiolothionate.

5. The compound of claim 1 which is O,O-diethyl S-[(1,3 - dimethyl - 5 - oxo - $\Delta^2$ - 1,2,4 - triazolin-4-yl)methyl]phosphorothiolothionate.

6. The compound of claim 1 which is diethyl [(1-allyl - 3 - methyl - 5 - thioxo - $\Delta^2$ - 1,2,4 - thiazolin-4-yl)methyl] phosphorothionate.

References Cited
UNITED STATES PATENTS 3,594,390  7/1971  Timmler et al. ____ 260—308 C

FOREIGN PATENTS 4,018,747  8/1965  Japan _____ 260—308

ALTON D. ROLLINS, Primary Examiner

U.S. Cl. X.R.

260—552 SC; 424—200